United States Patent
Boylan

(10) Patent No.: US 6,441,076 B1
(45) Date of Patent: Aug. 27, 2002

(54) MULTIFUNCTIONAL POLY(VINYL ALCOHOL) BINDER FOR FINE PARTICLE SIZE CALCIUM CARBONATE PIGMENT

(75) Inventor: John Richard Boylan, Bethlehem, PA (US)

(73) Assignee: Celanese International Corporation, Dallas, TX (US)

( * ) Notice: Subject to any disclaimer, the term of this patent is extended or adjusted under 35 U.S.C. 154(b) by 0 days.

(21) Appl. No.: 09/957,584

(22) Filed: Sep. 20, 2001

Related U.S. Application Data

(62) Division of application No. 09/435,177, filed on Nov. 5, 1999.

(51) Int. Cl.[7] .................................................. C08K 3/26
(52) U.S. Cl. ........................ 524/425; 524/503; 524/557; 525/56
(58) Field of Search ................................ 524/425, 503, 524/557; 525/56

(56) References Cited

U.S. PATENT DOCUMENTS 5,057,570 A * 10/1991 Miller et al. ................. 524/503
5,643,631 A * 7/1997 Donigian et al. ............ 427/218

* cited by examiner

Primary Examiner—Edward J. Cain
Assistant Examiner—Katarzyna W. Lee
(74) Attorney, Agent, or Firm—M. Susan Spiering

(57) ABSTRACT

Production of a paper coating composition having improved low shear viscosity at a high solids level of fine particle size calcium carbonate. The improvement in low shear viscosity is achieved by dissolving a fine particle size, partially hydrolyzed, low molecular weight poly(vinyl alcohol) powder in an aqueous slurry of pigment particles containing predominantly fine particle size calcium carbonate. Dissolution of the poly(vinyl alcohol) is achieved without external heating or adding water to the slurry. The slurry can then be formulated with other components to produce the ink jet paper coating composition which, when applied to a paper substrate, provides excellent ink jet printability.

3 Claims, No Drawings

MULTIFUNCTIONAL POLY(VINYL ALCOHOL) BINDER FOR FINE PARTICLE SIZE CALCIUM CARBONATE PIGMENT

This application is a division of application Ser. No. 09/435,177, filed Nov. 5, 1999.

BACKGROUND OF THE INVENTION

Paper coating compositions are used by the paper industry to impart the desired strength and cosmetic properties to finished paper. The coating composition is typically an aqueous dispersion consisting mainly of mineral pigments, such as clay, calcium carbonate, silica, and titanium dioxide, and pigment binders, such as starch and synthetic polymer emulsions. Coating compositions may also contain low levels of additives, such as thickeners, humectants and lubricants.

The coating compositions are usually applied to a continuous web of cellulosic material, such as paper, by high speed coating machines, such as blade coaters, air knife coaters, rod coaters and roll coaters. There are trends to use faster coaters to increase productivity and to use higher solids coating compositions to decrease drying costs and improve binder distribution which enhances paper quality.

Coatings which contain fine particle size pigments, such as calcium carbonate, have been shown to be particularly useful in improving the properties of ink jet recording paper. U.S. Pat. No. 5,643,631 (Donigian et al., 1997) and U.S. Pat. No. 5,783,038 (Donigian, et al., 1998) disclose thermal ink jet recording paper, incorporating heat aged precipitated calcium carbonate and a binder, such as poly(vinyl alcohol), starches, and carboxymethyl cellulose. Treatment of paper with a coating composition of a slurry of fine particle size calcium carbonate in a poly(vinyl alcohol) or starch solution resulted in improved optical density of ink jet print. An example of an appropriate poly(vinyl alcohol) binder was Airvol® 107 poly(vinyl alcohol) which is 98 to 98.8% hydrolyzed. The binders were "cooked" to obtain a solution prior to addition of the pigment slurry.

The use of poly(vinyl alcohol) and its derivatives as binders in ink jet coating systems are well known in the art. For example, an article by C. A. Finch in *Polyvinyl Alcohol—Developments,* Wiley, 1992, pages 555-556, describes the use of poly(vinyl alcohol) as a binder for ink-jet printing paper. Poly(vinyl alcohol), 98-99% hydrolyzed and a 4% viscosity of 25-31 cP (Poval-PVA-117) was reported to be generally used.

An article in *Tappi Journal, Vol.*80, No.1, January 1997, pp. 68-70, by John Boylan, entitled, "Using Polyvinyl Alcohol in Ink-Jet Printing Paper," describes the use of various grades of poly(vinyl alcohol) for coating paper. It is noted that partially hydrolyzed grades of poly(vinyl alcohol) provide the best printability in terms of ink optical density and dry time when used with silica pigments in paper coatings. However, the final viscosity of poly(vinyl alcohol)/silica coatings increases sharply with small increases in solids. Because of the viscosity increase, the maximum solids is about 25 to 30%, depending on the grade of poly(vinyl alcohol). Partially hydrolyzed low/medium molecular weight grades allow for the highest level of coating solids.

There are many patents on the use of poly(vinyl alcohol) as a pigment binder for paper coatings. For example:

U.S. Pat. No. 4,478,910 (Oshima et al., 1984) discloses ink jet recording paper comprising a base sheet with a specific sizing degree having a coating layer comprising a water-soluble polymeric binder and fine silica particles. The silica particles have a specific surface area of more than 200 $m^2/g$ and poly(vinyl alcohol) or its derivatives are desired as binder because of their optical density. PVA 117, manufactured by Kuraray, was used in the examples.

U.S. Pat. No. 4,780,356 (Otouma et al., 1988) discloses a recording sheet comprising a sheet of paper with porous particles on the paper surface. The porous particles (e.g., silica, silica-alumina, alumina, and silica-boria) have an average pore size of 10 to 5000 Å, a pore volume of 0.05 to 3.0 cc/g, and an average particle size of 0.1 to 50 $\mu$m. Poly(vinyl alcohol) may be used as a binder for the particles in an amount of 5 to 60% (preferably 20 to 40%) by weight based on the total weight of binder and particles. PVA 117, manufactured by Kuraray, was used in the examples.

U.S. Pat. No. 5,057,570 (Miller et al., 1991) discloses a method of preparing a high solids, aqueous paper coating composition in which dry particulate solids of a partially hydrolyzed, low molecular weight poly(vinyl alcohol) is added to a high solids, aqueous pigment dispersion and mixed, without external heating, until dissolved. The aqueous pigment dispersion typically contains clay and/or calcium carbonate at solids levels of 70 to 76%.

U.S. Pat. No. 5,270,103 (Oliver, 1993) discloses a receiver sheet having a coating and suitable for printing with aqueous based inks, comprising a pigment, poly(vinyl alcohol) binder, and an additional binder component. The poly(vinyl alcohol) is at least 87 mole % hydrolyzed, preferably at least 99 mole % hydrolyzed.

JP 11-4983 (1999) discloses mixing poly(vinyl alcohol) with an organic and/or inorganic powder, and combining the mixture with water to obtain a non-lumping dispersion having a high concentration of poly(vinyl alcohol). The dispersion is reported to be useful adhesives and paints. The poly(vinyl alcohol) powder has an average particle of 500 $\mu$m or less, a degree of polymerization of 500 to 3000 (preferably 100 to 2500), and is 75 to 95 mole % (preferably 75 to 90 mole %) hydrolyzed. The two materials are blended in a volume ratio of 1/0.2 to 1/15 poly(vinyl alcohol)/organic and/or inorganic particles. Examples of inorganic particles are clays, silica, calcium carbonate, and barium sulfate.

As noted above, fine particle size calcium carbonate has been shown to be a particularly useful pigment in coating compositions for ink jet recording paper; however the fine particle size results in a very high viscosity in the low shear rate range after the particles are put into a slurry at the levels needed for inkjet paper coating compositions. The high viscosity in this low shear rate range presents problems in handling the dispersion during the coating process.

BRIEF SUMMARY OF THE INVENTION

The present invention is directed to producing a paper coating composition having improved low shear viscosity at a high solids level of fine particle size calcium carbonate. The improvement in low shear viscosity is achieved by dissolving, without heating and without adding water, a fine particle size, partially hydrolyzed, low molecular weight poly(vinyl alcohol) powder in an aqueous slurry of pigment particles which is predominantly fine particle size calcium carbonate. The poly(vinyl alcohol) has an average particle size of 200 $\mu$m or less, is 85 to 90 mole % hydrolyzed, and has a degree of polymerization of 50 to 600. The slurry, containing 0.1 to 50 parts poly(vinyl alcohol) per 100 parts pigment particles, can then be formulated with other components to produce a paper coating composition for specific applications such as ink jet paper coatings.

There are several advantages to preparing a coating composition by first mixing fine particle size, partially hydrolyzed, low molecular weight poly(vinyl alcohol) powder directly to the fine particle size calcium carbonate slurry. They include:

the poly(vinyl alcohol) does not need to be solubilized prior to mixing with the calcium carbonate slurry, thus eliminating the problem of adding more water to the slurry and reducing the amount of solids;

the poly(vinyl alcohol) can be solubilized in the calcium carbonate slurry without heating;

the low shear viscosity of the calcium carbonate slurry is significantly reduced, thus allowing greater mixing efficiency, improved filterability, and improved pumping efficiency of the final coating formulation;

the solids level of the pigment slurry can be increased without increasing the shear viscosity, thus enabling easier handling of the final coating formulation;

binding of the calcium carbonate to a cellulosic substrate, despite its high surface area, is accomplished with a relatively small amount of poly(vinyl alcohol); e.g., as low as 5 to 15 parts of poly(vinyl alcohol) per 100 parts pigment;

no additional binders are needed in the final coating formulation; and the poly(vinyl alcohol)/calcium carbonate coating formulation, when applied to a paper substrate as an ink jet paper coating, provides excellent ink jet printability.

DETAILED DESCRIPTION OF THE INVENTION

The aqueous pigment dispersion typically consists of at least about 90% by weight fine particle size calcium carbonate at solids levels ranging from 10 to 50%; preferably 20 to 30%. Up to about 10% of other paper pigments such as clays, silica, and titanium dioxide may also be present.

The fine particle size calcium carbonate has a mean surface area of at least 50 $m^2/g$; preferably at least 80 $m^2/g$. Fine particle size calcium carbonate can be prepared by heat aging and/or milling precipitated calcium carbonate, such as the method described in U.S. Pat. Nos. 5,643,631 and 5,783,038. Calcium carbonate having a mean surface area of 80 $m^2/g$ is available commercially under the trademark JETCOA™ 30 Specialty PCC from Specialty Minerals.

Suitable fine particle size, low molecular weight, partially hydrolyzed poly(vinyl alcohol) powder for use in this invention can be 70 to 90, preferably 85 to 90, and most preferably 87 to 89 mole % hydrolyzed, have a degree of polymerization (DPn) of 50 to 600, preferably 150 to 300, and an average particle size of 200 $\mu$m or less; preferably, 180 $\mu$m or less. An example of a preferred poly(vinyl alcohol) powder is Airvol® 203S poly(vinyl alcohol) supplied by Air Products and Chemicals, Inc. The poly(vinyl alcohol) used in this invention can be prepared by synthesis and saponification techniques well-known to those skilled in the art of manufacturing poly(vinyl alcohol). A fine particle size of the poly(vinyl alcohol) can be achieved by grinding the poly(vinyl alcohol) particles and passing the particles through a mesh.

The fine particle size, low molecular weight, partially hydrolyzed poly(vinyl alcohol) powder is slowly added to an agitated calcium carbonate slurry at a rate that does not cause clumping of the poly(vinyl alcohol). Typically, adding poly(vinyl alcohol) at a rate of 1% of poly(vinyl alcohol) in 10 seconds is sufficient to prevent clumping. Mixing is continued until the poly(vinyl alcohol) is solubilized; typically, mixing is continued at least 15 minutes. Mixing of the calcium carbonate slurry with the dry fine poly(vinyl alcohol) powder is preferably carried out at high shear rates.

The amount of poly(vinyl alcohol) can range from 0.1 to 50 parts/100 parts of pigment; preferably 3 to 25 parts of poly(vinyl alcohol)/100 parts pigment. Amounts of 5 to 15 parts of poly(vinyl alcohol)/100 parts fine particle size calcium carbonate have been found to efficiently bind the pigment. Solubilization of the poly(vinyl alcohol) can be carried out at ambient temperature, i.e., 20° C. Heating is not required to solubilize the poly(vinyl alcohol).

Low shear viscosity is the viscosity of a fluid (for example, calcium carbonate slurry containing 28 to 32% solids and 3 to 25 parts low molecular weight, partially hydrolyzed poly(vinyl alcohol) per 100 parts calcium carbonate) which results from the shear rate generated by a Brookfield viscometer (No.3 spindle at 100 rpm).

The high solids aqueous pigment dispersion containing poly(vinyl alcohol) can be used to prepare ink jet paper coating compositions or can be used directly as an ink jet paper coating composition. No additional binders or dispersants are needed in the coating composition. A typical coating composition for ink jet paper applications contains:

90 to 100 parts fine particle size calcium carbonate;

0 to 10 parts secondary pigment;

0.1 to 50 parts poly(vinyl alcohol);

0 to 3 parts cationic dye fixatives such as polyethyleneimine or poly(diallyldimethyl ammonium chloride); and 0 to 0.3 parts defoamer.

The invention will be further clarified by a consideration of the following examples, which are intended to be purely exemplary of the invention.

EXAMPLE 1

Viscosity Modification Effect

The viscosity modification effect of low molecular weight, partially hydrolyzed, fine particle size poly(vinyl alcohol) on slurries of fine particle size calcium carbonate was measured. An aliquot of Jet Coat™ 30 precipitated calcium carbonate (500 g in a slurry containing 25 to 30 % solids) was agitated with a high shear Dispersator type laboratory mixer. Various amounts of Airvol® 203S poly(vinyl alcohol) powder, in which 99% of the powder particles have an average particle size of less than 180 $\mu$m, were added to the agitated mixture at a rate of 1% per 10 seconds. Agitation of the mixture was continued for 15 minutes after addition of the Airvol 203S. In a comparative example, 0.3 g of tetrasodium pyrophosphate (TSPP) dispersant was added to the calcium carbonate slurry. The Brookfield Viscosity was measured at 10, 20, 50, and 100 rpm. Results of the measurements are shown in Table 1.

TABLE 1

|  | Jet Coat 30* | 5 pts A 203S per | 10 pts A 203S per | 20 pts A 203S per | 0.3 pt TSPP (dispersant) per |
|---|---|---|---|---|---|
| Solids | 28.50% | 28.04% | 29.72% | 31.64% | 27.70% |
| Brookfield Viscosity |  |  |  |  |  |
| 10 rpm | 6960 | 1530 | 990 | 900 | 5870 |
| 20 rpm | 3980 | 810 | 545 | 550 | 3090 |
| 50 rpm | 2008 | 358 | 264 | 318 | 1308 |
| 100 rpm | 1152 | 209 | 165 | 223 | 690 |

*Supplied by Specialty Minerals as a slurry.

With most coatings, as solids increase, low shear viscosity increases. However, unexpectedly, addition of the Airvol 203S to the Jet Coat 30 resulted in a substantial reduction in low shear viscosity. Reduction of low shear viscosity leveled out at 20 parts Airvol 203S/100 parts calcium carbonate. The results obtained with the Airvol 203S were much better than those obtained with the TSPP dispersant.

EXAMPLE 2
Binding Effect

The effect of Airvol 203S as a binder for fine calcium carbonate particles on paper was measured. An uncoated base sheet of paper was secured to a glass plate with tape. The coating formulation was poured over the top width of the paper. A wire wound rod was placed at the top of the coating and drawn down the length of the paper applying a uniform application of the coating formulation across the length of the paper. The wet coated sheet was then dried in a forced air oven at 250° F. for 2 minutes.

The binding effect (IGT Pick Strength) was measured using Tappi Method T514 pm-82, "Surface Strength of Coated Paperboard." Table 2 presents the results of IGT pick strength measurements.

TABLE 2

|  | Jet Coat 30 (no A 203S) | 10 pts A 203S per 100 | 20 pts A 203S per 100 | 0.3 pts TSPP (dispersant) |
|---|---|---|---|---|
| IGT Pick Strength | No bonding | 9 | 14 | No bonding |

* VVP = viscosity velocity product (kilopoise-centimeters/second)

These data show that binding improved as the amount of Airvol 203S increased from 10 to 20 parts/100 parts Jet Coat 30. No bonding occurred using Jet Coat 30 alone or Jet Coat 30 with TSPP.

EXAMPLE 3
Printability

The ink jet printability of paper coated with a combination of Jet Coat 30 and Airvol 203S poly(vinyl alcohol) was measured by applying the coating formulation with a wire wound rod to an uncoated base sheet and drying the coating at 250° F. for 2 minutes. Coat weights were between 8 and 10 g/m$^2$. Airvol 203S alone and a mixture of 0.3 pt. TSPP with Jet Coat 30 were used as comparative examples. The coated paper was printed on an Hewlett Packard HP 560 ink jet printer using a test pattern developed by Hewlett Packard. The optical density was measured with a Tobias IQ 200 Densitometer. The results are presented in Table 3.

TABLE 3

|  | Base Sheet | A203S | 10 pts | 20 pts | 0.3 pts TSPP |
|---|---|---|---|---|---|
| Comp Black | 0.57 | 0.75 | 0.94 | 0.96 |  |
| Magenta | 0.77 | N/A | 1.14 | 1.1 | Dusting |
| Yellow | 0.61 | N/A | 0.85 | 0.83 |  |
| Cyan | 1.03 | 1.11 | 1.48 | 1.4 |  |
| Mono Black | 0.86 | 0.94 | 1.32 | 1.24 |  |

Ink jet printability of a binder used for ink jet paper coatings is very important. The binder must be hydrophilic enough to allow the ink vehicle to penetrate into the coating while allowing the ink to remain at the surface of the coating with the pigment. In addition, the binder must not contain undesirable surfactants which adversely effect the surface energy of the coating causing the ink to spread creating high ink dot gain leading to poor letter and image formation. One measure of ink jet printability is the ink optical density. The greater the density, the deeper the color shade produced.

The data in Table 3 show that the combinations of Jet Coat 30 and Airvol 203S provide significantly better optical density of ink jet printing than A203S alone. Airvol 203S is shown here to provide the hydrophilic property and it does not contain undesirable surfactants.

EXAMPLE 4
Comparison to other Pigments

The example compares the effect of Airvol 203S on the low shear viscosity of several pigments typically used for paper coating applications. An aliquot of pigment slurry was weighed out and water was added, if necessary to obtain the desired solids level. Agitation was then begun with a laboratory type mixer. Airvol 203S was slowly added to the agitating pigment slurry and mixing was continued for about 30 minutes. Complete solubilization of the Airvol 203S was checked by rinsing a small sample through a 325 mesh screen and checking for unsolubilized poly(vinyl alcohol). When the poly(vinyl alcohol) was completely dissolved, the final solids was measured via the microwave technique. The viscosity of the mixture was then measured with a Brookfield viscometer at 100 rpm. Results are presented in Table 4.

TABLE 4

| Run | Pigment Type | Pigment % | Airvol 203S | Brookfield |
|---|---|---|---|---|
| 1 | Calcium Carbonate-A | 12.6 | 70 | 0 | 85 |
| 2 | Calcium Carbonate-A | 12.6 | 70 | 5 | 775 |
| 3 | Calcium Carbonate-A | 12.6 | 70 | 10 | 3252 |
| 4 | Calcium Carbonate-A | 12.6 | 70 | 20 | 4560 |
| 5 | Calcium Carbonate-A | 12.6 | 30 | 0 | 15 |
| 6 | Calcium Carbonate-A | 12.6 | 30 | 5 | 19 |
| 7 | Calcium Carbonate-A | 12.6 | 30 | 10 | 25 |
| 8 | Calcium Carbonate-A | 12.6 | 30 | 20 | 40 |
| 9 | Calcium Carbonate-B | 7.1 | 70 | 0 | 204 |
| 10 | Calcium Carbonate-B | 7.1 | 70 | 5 | 400 |
| 11 | Calcium Carbonate-B | 7.1 | 70 | 10 | 2240 |
| 12 | Calcium Carbonate-B | 7.1 | 70 | 20 | 2830 |
| 13 | Calcium Carbonate-B | 7.1 | 30 | 0 | 14.4 |
| 14 | Calcium Carbonate-B | 7.1 | 30 | 5 | 18 |
| 15 | Calcium Carbonate-B | 7.1 | 30 | 10 | 25.1 |
| 16 | Calcium Carbonate-B | 7.1 | 30 | 20 | 39 |
| 17 | Jet Coat 30 Calcium Carbonate | 80 | 30 | 0 | 1152 |
| 18 | Jet Coat 30 Calcium Carbonate | 80 | 30 | 5 | 209 |
| 19 | Jet Coat 30 Calcium Carbonate | 80 | 30 | 10 | 165 |
| 20 | Jet Coat 30 Calcium Carbonate | 80 | 30 | 20 | 223 |
| 21 | Clay | 15 | 70 | 0 | 241 |
| 22 | Clay | 15 | 70 | 10 | 2140 |
| 23 | Clay | 15 | 30 | 0 | 17.2 |
| 24 | Clay | 15 | 30 | 10 | 31 |
| 25 | Titanium Dioxide | 7–30 | 70 | 0 | 125 |
| 26 | Titanium Dioxide | 7–30 | 70 | 10 | 288 |

The pigments of run no. 1-16 and 21-26 had low viscosities at 30% solids due to the greater particle size or reduced surface area of these pigments compared to the Jet Coat 30 (run no. 17-20); i.e., the Jet Coat 30 particles have a mean surface area which is 5 to 8 times the mean surface area of the other pigments in the example. It is well known that as the surface area of pigment particles increase, the viscosity of pigment slurries increase and addition of a binder, such as poly(vinyl alcohol), will result in a further increase in viscosity. However, unexpectedly, when Airvol 203S was added to the Jet Coat 30 calcium carbonate slurry (run no. 17-20), there was a substantial decrease in viscosity. In contrast, the viscosity increased when Airvol 203S was added to the other pigment slurry samples (run no. 1-16, 21-26).

What is claimed is:

1. A method of lowering the viscosity of an aqueous dispersion of fine particle size calcium carbonate 20 to 30% solids, having a mean surface area of at least 60 m$^2$/g for use in a paper coating composition comprising adding to said aqueous dispersion poly(vinyl alcohol) in an amount of from 0.1 to 50 parts by weight poly(vinyl alcohol) per 100 parts calcium carbonate, the poly(vinyl alcohol) having a degree of polymerization of 150 to 300 and beinig 87 to 89 mole % hydrolyzed, and the poly(vinyl alcohol) particles having an average particle size of 180 μm or less.

2. The method of claim 1 wherein poly(vinyl alcohol) is added in an amount of from 3 to 25 parts poly(vinyl alcohol)/100 parts calcium carbonate.

3. The method of claim 1 wherein poly(vinyl alcohol) is added in an amount of from 5 to 15 parts poly(vinyl alcohol/100 parts calcium carbonate.

* * * * *

UNITED STATES PATENT AND TRADEMARK OFFICE
CERTIFICATE OF CORRECTION

PATENT NO.    : 6,441,076 B1
DATED         : August 27, 2002
INVENTOR(S)   : Boylan It is certified that error appears in the above-identified patent and that said Letters Patent is hereby corrected as shown below:

<u>Column 6,</u>
Line 67, insert -- containing -- between "carbonate" and "20".

Signed and Sealed this

Thirteenth Day of January, 2004

JON W. DUDAS
*Acting Director of the United States Patent and Trademark Office*